Sept. 9, 1924.

J. R. PARKER

CHILD'S VEHICLE

Filed Feb. 16, 1923

1,507,975

Inventor

J. R. Parker

Patented Sept. 9, 1924.

1,507,975

UNITED STATES PATENT OFFICE.

JOHN ROBIE PARKER, OF WINNIPEG, MANITOBA, CANADA.

CHILD'S VEHICLE.

Application filed February 16, 1923. Serial No. 619,406.

*To all whom it may concern:*

Be it known that I, JOHN ROBIE PARKER, a subject of the King of Great Britain, of the city of Winnipeg, in the Province of Manitoba, Canada, have invented certain new and useful Improvements in Children's Vehicles, of which the following is the specification.

The invention relates to improvements in hobby horses and an object of the invention is to provide a hobby horse which can be propelled by the child riding the same and which is so designed that the movement of the toy horse simulates the natural movement of a galloping horse, such construction making the riding of the hobby horse very realistic for the child.

A further object of the invention is to construct the hobby horse in a simple and durable manner and so that it can be readily assembled and such that it is entirely operated by the weight of the body of the rider.

With the above more important objects in view the invention consists essentially in the arrangement and construction of parts hereinafter more particularly described and later pointed out in the appended claims, reference being had to the accompanying drawing in which:

In the drawing like characters of reference indicate corresponding parts in the several figures.

Figure 1:
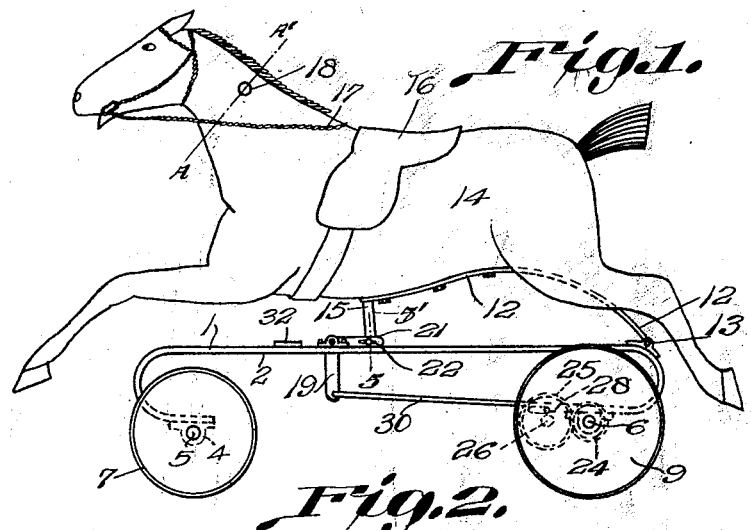
Fig. 1 is a side view of the complete hobby horse.
Figure 2:
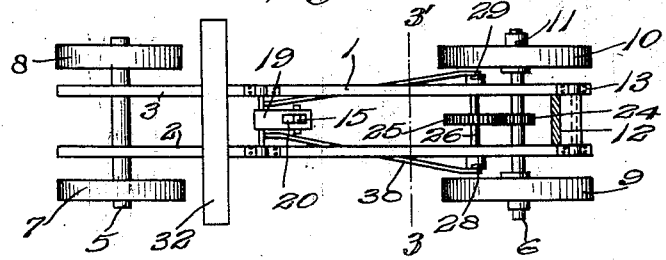
Fig. 2 is a plan view of the lower part of the appliance, the horse body being removed.
Figures 3, 4:
Fig. 3 is an enlarged detailed vertical sectional view at 3—3' Fig. 2 and looking rearwardly.
Fig. 4, is an enlarged detailed sectional view at 4—4' Fig. 1.
Figure 5:
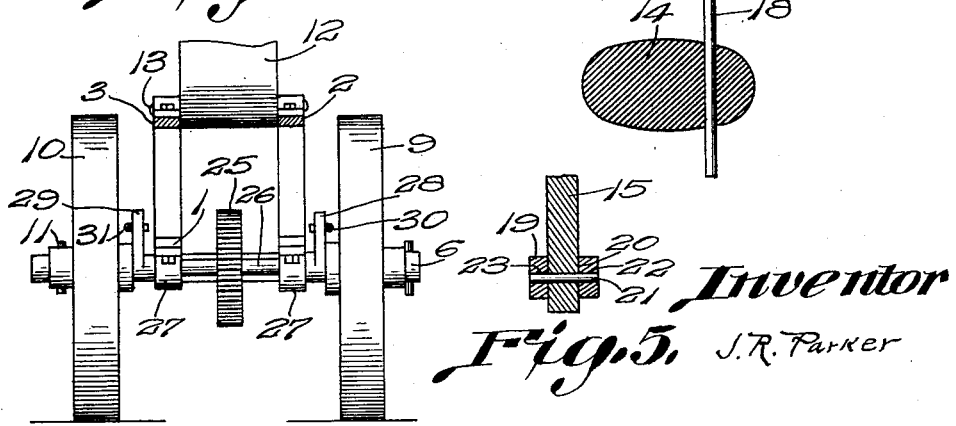
Fig. 5 is a sectional view at 5—5' Fig. 1.

A frame 1 is provided, such frame embodying similar spaced parallel side bars 2 and 3, the said side bars having their forward and rear ends curved downwardly and inwardly in a U shaped manner and provided with suitable pairs of bearings 4 which receive the front and rear axles 5 and 6. The axles are supported by front wheels 7 and 8 and rear wheels 9 and 10, one of the rear wheels being fastened to the rear axle as by a pin 11. A supporting bar 12 is pivotally attached at 13 to the rear part of the frame and such bar is permanently fastened to the under side of the hobby horse 14, the said horse being designed so that its front and rear legs overhang, but clear the frame. The forward end of the bar 12 is turned downwardly more or less centrally beneath the belly of the horse to provide a shank 15 which, in the downward movement of the horse, is adapted to pass between the frame bars. The horse is supplied with a suitable saddle 16 and reins 17 and has a hand grip 18 extending through the neck and projecting at either side.

A bell crank 19 is pivotally carried by the frame members 2 and 3, one arm of the crank extending downwardly whilst the other arm extends rearwardly and is vertically slotted, as indicated at 20, to receive the lower end of the shank 15 which passes therethrough. A pin 21 connects the shank slidably to the latter arm of the bell crank, said pin being mounted slidably in similar side slots 22 and 23 provided in the bell crank arm.

From this arrangement it will be obvious that when the hobby horse is swung upwardly and downwardly the shank will turn the bell crank and cause the downwardly extending arm thereof to swing forwardly and rearwardly.

To the rear axle 6 I permanently attach a gear wheel 24 which is meshed with a further gear wheel 25, the latter gear wheel being carried by a counter shaft 26 rotatably mounted in suitable bearings 27 carried by the rear ends of the bars 2 and 3. The counter shaft has the ends thereof formed into cranks 28 and 29 and these cranks are connected by operating rods 30 and 31 to the downwardly extending arm of the bell crank. From this arrangement it will be seen that the movement of the bell crank is utilized to drive the rear axle and consequently the wheel 10 so that the hobby horse can be propelled along the floor or such like.

A foot rest 32 in the form of a cross bar is permanently secured to the frame members 2 and 3 in a location somewhat in advance of the bell crank and located such that it forms a natural rest for the feet of the child sitting on the saddle and permits the child to lift his body to relieve his weight from the horse. This latter raising action is facilitated by a pulling action of the hands on the hand grip 18. In order to better understand the action of the device I will now describe the manner in which the hobby horse is ridden.

The parts will be preferably brought to a position, such as shown in Fig. 1, by initially moving the horse along the floor. The child then mounts the saddle, placing his feet on the foot rest and his hands on the hand grips. Obviously he can relieve his weight entirely from the horse by throwing his body ahead so that his weight is carried by the foot rest. When he is ready to ride he relieves his weight onto the horse which action causes the horse to move downwardly and the bell crank to rotate the gears and consequently the rear wheels. Having done this he relieves his weight from the horse and the momentum of the moving parts carries the cranks around, the horse rising until it reaches its upper position. When this is reached the child again puts his weight on the horse which again actuates the crank and increases the speed of travel. By repeating the body movement the child can continuously propel the hobby horse and can increase or diminish his speed as he desires.

I wish it to be noted that as the hobby horse moves the child is given a movement simulating the natural movement of a galloping horse as he has a forward movement as well as an up and down movement. His knees and arms are also in action very similar to that required in driving a horse and the whole operation is so natural that it is not only enjoyable but also beneficial to the child as he gets considerable exercise in riding.

Whilst I have shown a horse mounted on the frame it will be readily understood that such is not essential as the device can be propelled provided the child is given a seat where, by the weight of his body, he can actuate the working parts. Further, I do not wish to be limited to the particular arrangement of cranks and links shown as these could be readily modified to accomplish a driving connection between the bell crank and the gears and without departing from the spirit of the invention as set forth in the accompanying claims.

What I claim as my invention is:

1. The combination with a wheeled frame, said frame presenting a foot rest, of an operator's seat carried by the frame and adjoining the foot rest, said seat being mounted to permit an up and down movement thereof in the direction of a wholly vertical arc, a clutchless wheel driving mechanism carried by the frame and an operating connection between the seat and the wheel driving mechanism whereby the vertical movement of the seat is utilized to actuate the wheel driving mechanism.

2. The combination with a wheel frame, said frame presenting a foot rest, of a seat carried by the frame and having an up and down movement in the direction of a wholly vertical arc and in a location adjoining the foot rest, and clutchless mechanism for converting the vertical movement of the seat into a rotary movement of the wheels.

3. The combination with a wheeled frame, said frame being provided with a foot rest, of a seat situated above the frame and adjoining the foot rest, means rearwardly pivoted to the frame and supporting the seat for movement in the direction of a wholly vertical arc and clutchless mechanism for converting the vertical swinging movement of the seat into a rotary movement for driving the wheels.

4. The combination with a wheeled frame, said frame being provided with a foot rest, of a seat situated above the frame and adjoining the foot rest, means rearwardly pivoted to the frame and supporting the seat for up and down vertical swinging movement, a downwardly extending shank moving with the seat, a bell crank pivotally attached to the frame and presenting a vertical and horizontal arm, a connection between the shank and the bell crank effecting the swinging of the bell crank in the up and down movement of the shank and a driving connection between the bell crank and the wheels of the frame.

5. The combination with a wheeled frame, said frame being provided with a foot rest, of a seat situated above the frame and adjoining the foot rest, means rearwardly pivoted to the frame and supporting the seat for up and down vertical swinging movement, a downwardly extending shaft moving with the seat, a bell crank pivotally attached to the frame and presenting a horizontally extending and a downwardly extending arm, a connection between the shank and the horizontal arm of the bell crank, said connection upon movement of the seat effecting the turning of the bell crank in the up and down movement of the shank, a driving pinion connected with the rear wheels of the frame, a shaft carried by the frame, a gear wheel, secured to the shaft and meshing with the former gear wheel, and a driving connection between the downwardly extending arm of the bell crank and the crank shaft.

6. In combination, a frame provided with forward and rear axles and wheels supporting the axles, a figure of a horse positioned above the frame and presenting a seat, a rearwardly extending bar having the rear end pivotally attached to the rear part of the frame and the forward end secured to the figure, a foot rest carried by the frame in a location adjacent the seat of the horse, a shank extending downwardly from the under side of the horse, a bell crank pivotally carried by the frame and presenting rearwardly and downwardly extending arms, a pin slidably connecting the shank to the rearwardly extending arm of the bell crank, and a driving connection between the downwardly extending arm of the bell crank and the rear axle, said driving connection converting the forward and backward swinging movement of the latter bell crank arm into a rotary movement at the rear axle.

JOHN ROBIE PARKER.